United States Patent
Radivojevic et al.

(10) Patent No.: US 9,324,508 B2
(45) Date of Patent: Apr. 26, 2016

(54) SUBSTRATE FOR ELECTRODE CAPABLE OF UNDERGOING REVERSIBLE DEFORMATION

(75) Inventors: Zoran Radivojevic, Cambridge (GB); Di Wei, Cambridge (GB); Samiul Haque, Cambridge (GB); Piers Andrew, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 470 days.

(21) Appl. No.: 13/160,852

(22) Filed: Jun. 15, 2011

(65) Prior Publication Data

US 2012/0320492 A1 Dec. 20, 2012

(51) Int. Cl.
| | |
|---|---|
| *H01G 9/00* | (2006.01) |
| *H01G 9/02* | (2006.01) |
| *H01G 5/00* | (2006.01) |
| *H01G 5/18* | (2006.01) |
| *H01M 14/00* | (2006.01) |
| *H01G 11/28* | (2013.01) |
| *H01G 11/14* | (2013.01) |
| *H01M 10/058* | (2010.01) |
| *H01M 10/42* | (2006.01) |
| *H01M 4/66* | (2006.01) |
| *H01M 10/0525* | (2010.01) |
| *H01M 4/587* | (2010.01) |
| *H01M 10/615* | (2014.01) |
| *H01M 10/623* | (2014.01) |

(52) U.S. Cl.
CPC ............... *H01G 11/28* (2013.01); *H01G 11/14* (2013.01); *H01M 4/66* (2013.01); *H01M 10/058* (2013.01); *H01M 10/0525* (2013.01); *H01M 10/4235* (2013.01); *H01M 4/587* (2013.01); *H01M 10/615* (2015.04); *H01M 10/623* (2015.04); *H01M 2220/30* (2013.01); *Y02E 60/13* (2013.01); *Y10T 29/417* (2015.01); *Y10T 29/49115* (2015.01)

(58) Field of Classification Search
CPC .......... H01G 9/155; H01G 9/00; Y02E 60/13
USPC ............... 361/503, 502, 504, 287, 291; 429/7
See application file for complete search history.

(56) References Cited

U.S. PATENT DOCUMENTS 3,617,387 A * 11/1971 Grulke et al. ................. 429/162
5,800,939 A *  9/1998 Mishina et al. ................. 429/57

(Continued)

FOREIGN PATENT DOCUMENTS

| CN | 1121264 A | 4/1996 | |
|---|---|---|---|
| EP | 0 336 102 A2 | 2/1989 | |
| EP | 0336102 A2 * | 10/1989 | ............ H01M 10/16 |
| EP | 1 548 768 A2 | 6/2005 | |
| EP | 2 284 933 A1 | 2/2011 | |

OTHER PUBLICATIONS

Kaltenbrunner, m., et al., "Arrays of Ultracompliant Electrochemical Dry Gel Cells for Stretchable Electronics", © 2010 WILEY-VCH Verlag GmbH & Co. KGaA, Weinheim, 3 pgs.

(Continued)

*Primary Examiner* — Eric Thomas
*Assistant Examiner* — Arun Ramaswamy
(74) *Attorney, Agent, or Firm* — Harrington & Smith

(57) ABSTRACT

An apparatus including first and second electrodes separated by an electrolyte, at least one of the first and second electrodes including an actuating substrate configured to undergo reversible deformation during actuation, wherein reversible deformation of the actuating substrate causes a decrease in the internal resistance of the apparatus.

20 Claims, 10 Drawing Sheets

(56) References Cited

U.S. PATENT DOCUMENTS

| | | | |
|---|---|---|---|
| 6,352,797 B1 | 3/2002 | Yoshida et al. | 429/313 |
| 2008/0070103 A1* | 3/2008 | Lin et al. | 429/101 |
| 2008/0297972 A1* | 12/2008 | Matz | 361/277 |
| 2010/0178568 A1 | 7/2010 | Unalan et al. | 429/317 |

OTHER PUBLICATIONS

Kovtyukhova, N.I., et al., "Layer-by-Layer Assembly of Ultrathin Composite Films from Micron-Sized Graphite Oxide Sheets and Polycations", © 1999 American Chemical Society, 8 pgs.

* cited by examiner

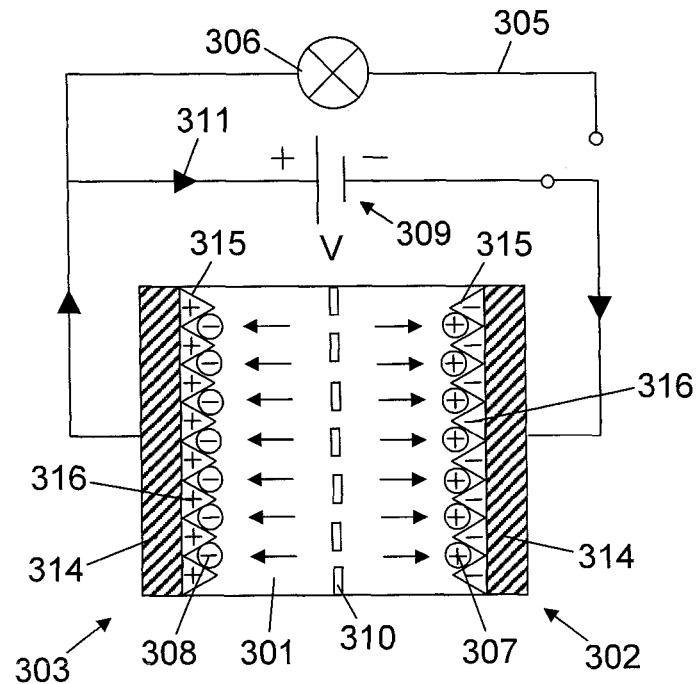
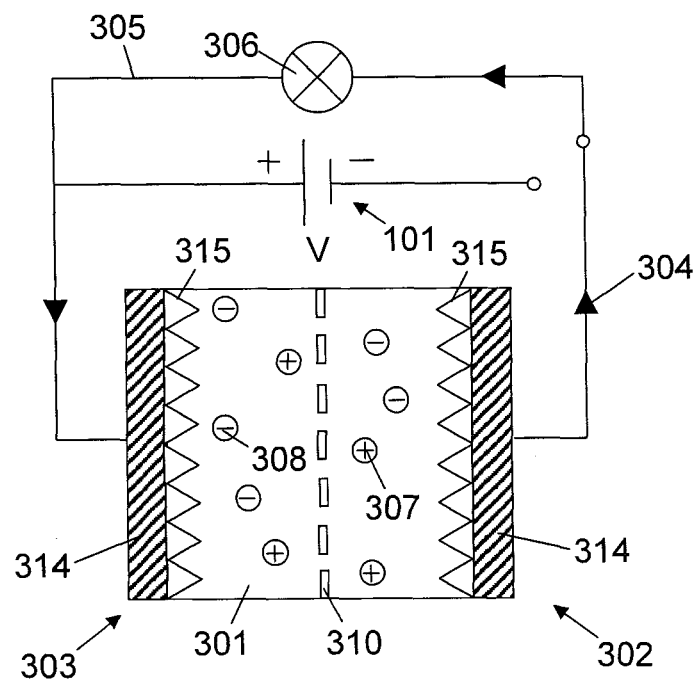

Figure 5a
Figure 5b
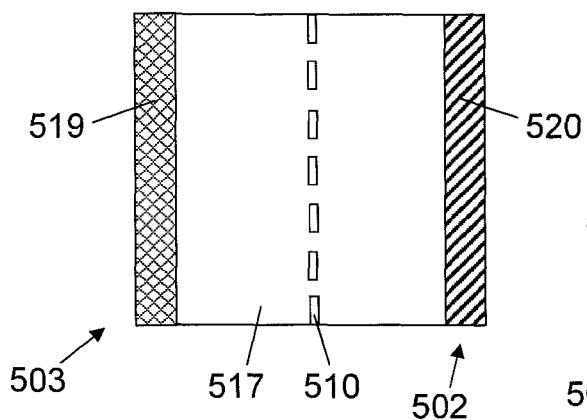
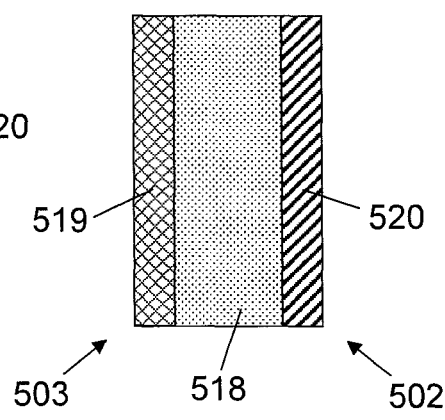
Figure 6
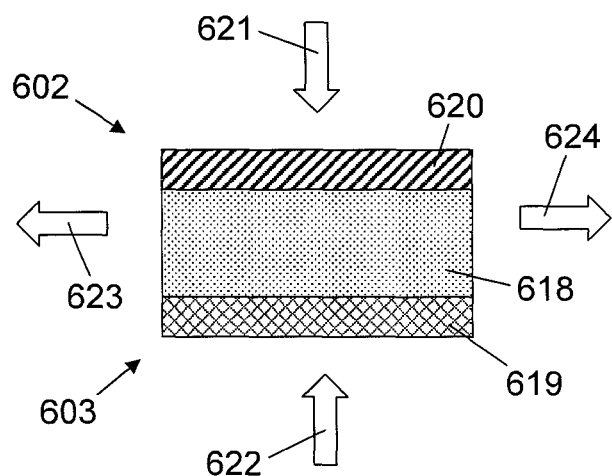
Figure 7
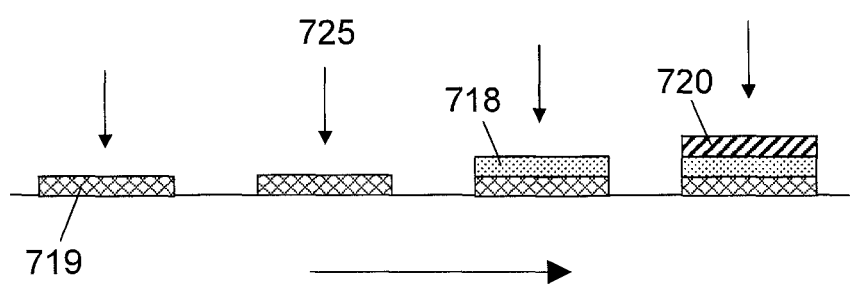

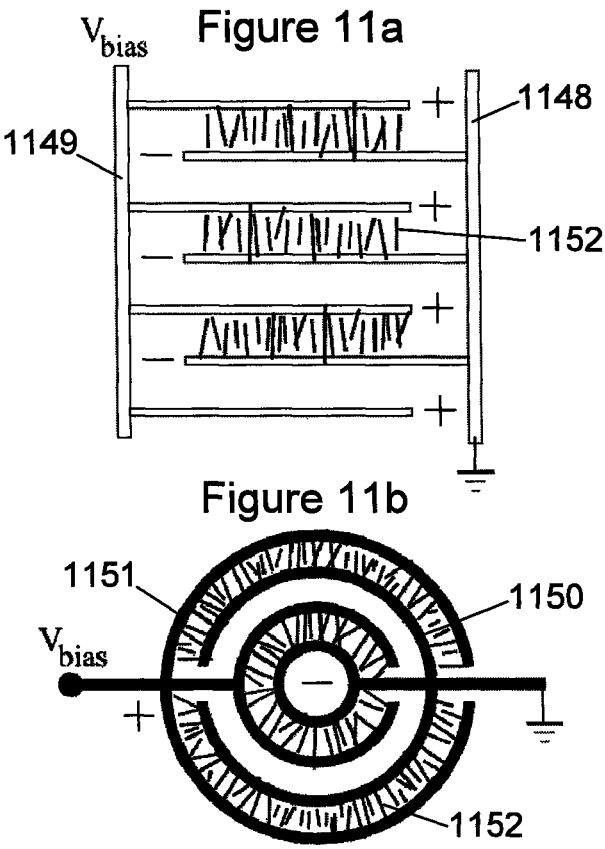
Figure 11a
Figure 11b
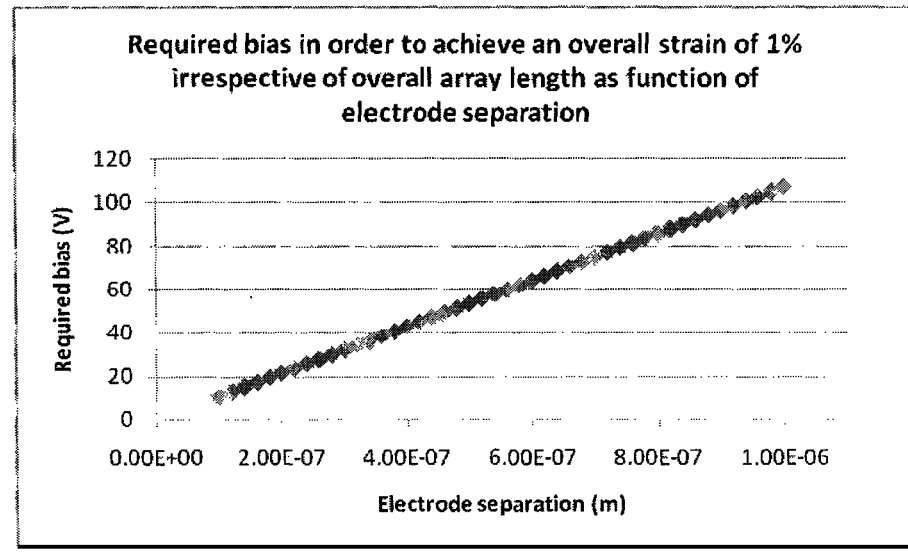
Figure 11c

SUBSTRATE FOR ELECTRODE CAPABLE OF UNDERGOING REVERSIBLE DEFORMATION

TECHNICAL FIELD

The present disclosure relates to the field of flexible/stretchable electronics, associated methods and apparatus, and in particular concerns an electrical storage apparatus comprising an actuating substrate configured to undergo reversible deformation during actuation to reduce the internal resistance (which may result in an increase in the open circuit voltage of the electrical storage apparatus). Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Traditional batteries have characteristic discharge curves which exhibit an initial rapid voltage drop followed by a lengthy plateau. Many electronic devices exhibit a threshold operating voltage. When the battery potential falls below this threshold, the device simply stops operating rather than degrading in performance as the battery potential decreases. However, there is still a significant amount of sub-threshold energy stored in the plateau discharge state of such an "empty" battery.

It is possible to temporarily recover this sub-threshold energy by warming the battery to increase the potential above the threshold level of the device. This method works by increasing the rate of electrochemical reactions within the cell, but is unsuitable for use with modern lithium-ion batteries where the rate of battery degradation is strongly dependent on temperature.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising first and second electrodes separated by an electrolyte, at least one of the first and second electrodes comprising an actuating substrate configured to undergo reversible deformation during actuation, wherein reversible deformation of the actuating substrate causes a decrease in the internal resistance of the apparatus.

Reversible deformation of the actuating substrate may increase the area of contact between the at least one electrode and the electrolyte to cause the decrease in internal resistance.

The at least one electrode may comprise an active material on or within the actuating substrate. Reversible deformation of the actuating substrate may increase the area of contact between the active material and the electrolyte to cause the decrease in internal resistance.

The term "active material" may be taken to mean the electrode material which takes part in the charging/discharging mechanism of the apparatus. In a battery, for example, the active material may be an electrode material which participates in an electrochemical reaction or intercalation mechanism. In a supercapacitor, on the other hand, the active material may be an electrode material which participates in the formation of an electric double layer.

The term "electrolyte" may be taken to mean any material which separates the electrodes of the apparatus, and may therefore encompass both an electrically insulating material (e.g. dielectric) as used in conventional electrostatic capacitors, as well as an electrically conducting material as used in electrolytic capacitors and supercapacitors.

At least one of the active material and electrolyte may be reversibly deformable. The active material may comprise at least one of the following: graphene, graphene platelets, a silver nanowire mesh, silicon nanowires, carbon nanotubes, and a metal oxide slurry. The electrolyte may be a polymer electrolyte. The polymer electrolyte may comprise at least one of a polyester and a polyglycol. The polymer electrolyte may comprise a borate dopant.

The actuating substrate may comprise an elastomer. The elastomer may comprise at least one of polydimethylsiloxane (PDMS) and polyethylene terephthalate (PET).

The at least one electrode may comprise a charge collector.

The first and second electrodes may each comprise an actuating substrate configured to undergo reversible deformation during actuation.

The apparatus may be an electrical storage apparatus. The apparatus may be configured for the generation (e.g. via redox reactions or an intercalation mechanism) and/or storage (e.g. via charge separation) of electrical energy. The apparatus may be a primary battery, a secondary battery, an electrostatic (conventional) capacitor, an electrolytic capacitor, a supercapacitor, or a battery-capacitor hybrid. The apparatus may be a lithium battery, a lithium-ion battery, or a lithium-ion capacitor.

The actuating substrate may be configured for one or more of mechanical (bending, compressing, stretching, etc), thermal, and piezoelectric actuation. The actuating substrate may be configured to undergo at least one of tensile, compressive, volume, and shearing strain.

The at least one electrode may comprise a heating element. The heating element may comprise an electrically conductive material (such as gold or copper). The heating element may be configured to increase the temperature of the actuating substrate and cause reversible deformation of the actuating substrate via thermal expansion.

The at least one electrode may comprise a piezoelectric material, such as lead zirconate titanate (PZT) or polyvinylidene fluoride (PVDF). The piezoelectric material may be configured to undergo reversible deformation when exposed to an applied electric field.

The apparatus may comprise more than two electrodes (i.e. multiple electrode pairs). This feature may enable a greater amount of electrical energy to be generated and/or stored compared to an apparatus comprising a single electrode pair. The electrodes of each electrode pair may be separated by an electrolyte.

According to a further aspect, there is provided a device comprising any apparatus described herein. The device may be at least one of the following: an electronic device, a portable electronic device, a portable telecommunications device, and a module for any of the aforementioned devices.

The device may comprise an actuation mechanism for effecting actuation of the actuating substrate. The actuation mechanism may enable control of the heating element. The actuation mechanism may enable control of the electric field.

The actuation mechanism may enable mechanical compression of the actuating substrate. The actuation mechanism may comprise at least one screw for controlling the degree to which the actuating substrate is compressed. The apparatus may have a roll-up form factor. The actuation mechanism may enable compression of the actuating substrate via tightening of the roll. The actuation mechanism may enable compression of the actuating substrate via the application of a force perpendicular to the length of the roll.

The device may comprise a locking mechanism for maintaining the current level of mechanical compression. The locking mechanism may comprise a releasable ratchet. The releasable ratchet may comprise a plurality of teeth for allowing a stepwise variation in the degree of mechanical compression.

According to a further aspect, there is provided a method comprising: depositing a first electrode material; depositing an electrolyte material on top of the first electrode material; and depositing a second electrode material on top of the electrolyte material to form an apparatus comprising first and second electrodes separated by an electrolyte, at least one of the first and second electrodes comprising an actuating substrate configured to undergo reversible deformation during actuation, wherein reversible deformation of the actuating substrate causes a decrease in the internal resistance of the apparatus.

At least one of the first electrode material, the electrolyte material, and the second electrode material may be deposited using a printing or coating process. Deposition of the first and/or second electrode material may comprise deposition of at least one of an actuating substrate material, an active material, and a charge-collection material. The method may comprise applying heat and/or pressure after deposition of the first electrode material, the electrolyte material, and/or the second electrode material.

The method may comprise the following steps before deposition of the first and/or second electrode material: depositing a layer of resist; exposing the resist to a beam of electrons or electromagnetic illumination; and developing the resist after exposure to produce a patterned resist profile. The method may further comprise removing the resist after deposition of the first or second electrode material to produce a pattern of first or second electrode material, respectively.

The method may comprise the following steps after deposition of the first and/or second electrode material: depositing a layer of resist; exposing the resist to a beam of electrons or electromagnetic illumination; developing the resist after exposure to produce a patterned resist profile; etching the first or second electrode material to produce a pattern of first or second electrode material, respectively; and removing the resist.

According to a further aspect, there is provided a method comprising: providing/using an apparatus comprising first and second electrodes separated by an electrolyte, at least one of the first and second electrodes comprising an actuating substrate configured to undergo reversible deformation during actuation, wherein reversible deformation of the actuating substrate causes a decrease in the internal resistance of the apparatus; and actuating the actuating substrate.

The steps of any method disclosed herein do not have to be performed in the exact order disclosed, unless explicitly stated or understood by the skilled person.

According to a further aspect, there is provided a computer program, recorded on a carrier, the computer program comprising computer code configured to perform any method described herein.

The apparatus may comprise a processor configured to process the code of the computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described example embodiments.

The above summary is intended to be merely exemplary and non-limiting.

BRIEF DESCRIPTION OF THE FIGURES

A description is now given, by way of example only, with reference to the accompanying drawings, in which:—

FIG. 3a illustrates schematically the charging process of a supercapacitor;

FIG. 3b illustrates schematically the discharge process of a supercapacitor;

FIG. 5a illustrates schematically a reversibly deformable electrical storage apparatus comprising a liquid electrolyte;

FIG. 5b illustrates schematically a reversibly deformable electrical storage apparatus comprising a solid or gel electrolyte;

FIG. 6 illustrates schematically a reversibly deformable electrical storage apparatus under the influence of compressive and tensile forces;

FIG. 7 illustrates schematically a method of making a reversibly deformable electrical storage apparatus;

FIG. 11a illustrates schematically an actuating substrate configured for uniaxial piezoelectric actuation;

FIG. 11b illustrates schematically an actuating substrate configured for radial piezoelectric actuation;

FIG. 11c shows how the potential difference required to achieve 1% strain varies with electrode separation;

DESCRIPTION OF SPECIFIC ASPECTS/EMBODIMENTS

In electrical circuits, batteries and capacitors are used to provide other components with electrical power. These power supplies operate in completely different ways, however.

Figure 1A:
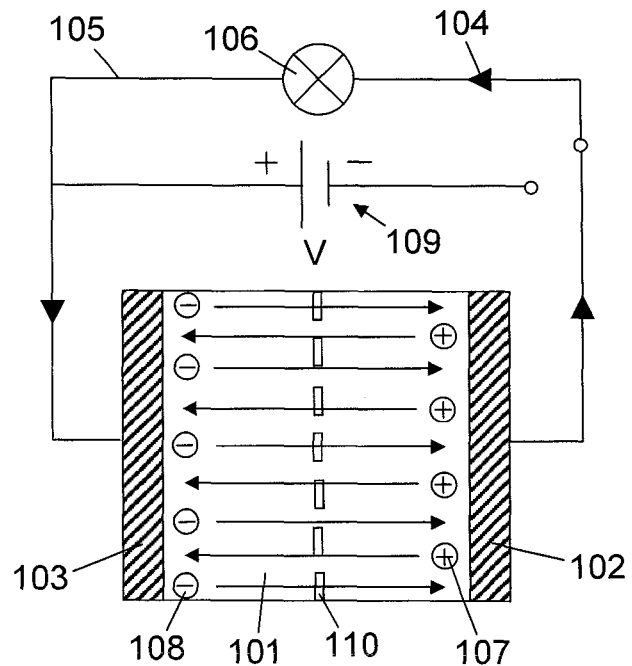
FIG. 1a illustrates schematically the discharge process of a conventional battery.

Batteries use electrochemical reactions to generate electricity. The discharge process of a conventional battery is shown in FIG. 1a. Batteries comprise two electrical terminals (electrodes 102, 103) separated by an electrolyte 101. A battery may also contain a separator 110 to prevent direct physical contact between the electrodes, which is particularly important when liquid electrolytes are used. At the negative electrode (the anode 102), an oxidation reaction takes place which produces electrons. These electrons flow round an external circuit 105 (indicated by the arrows 104) from the anode 102 to the positive electrode (the cathode 103) causing a reduction reaction to take place at the cathode 103. The flow of electrons can be used to power one or more electrical components 106 in the external circuit 105. The oxidation and reduction reactions may continue until the reactants are completely converted. Importantly though, unless electrons are able to flow from the anode 102 to the cathode 103 via the external circuit 105, the electrochemical reactions cannot take place. This allows batteries to store electricity for long periods of time. As the electrons flow round the external circuit from the anode 102 to the cathode 103, a negative charge cloud develops in the electrolyte 101 around the cathode 103, and a positive charge cloud develops in the electrolyte 101 around the anode 102. Positive 107 and negative 108 ions in the electrolyte 101 move to neutralize these charge clouds, allowing the reactions, and the flow of electrons, to continue. Without the ions 107, 108 from the electrolyte 101, the charge clouds around each electrode 102, 103 would inhibit the generation of electricity.

Figure 1B:
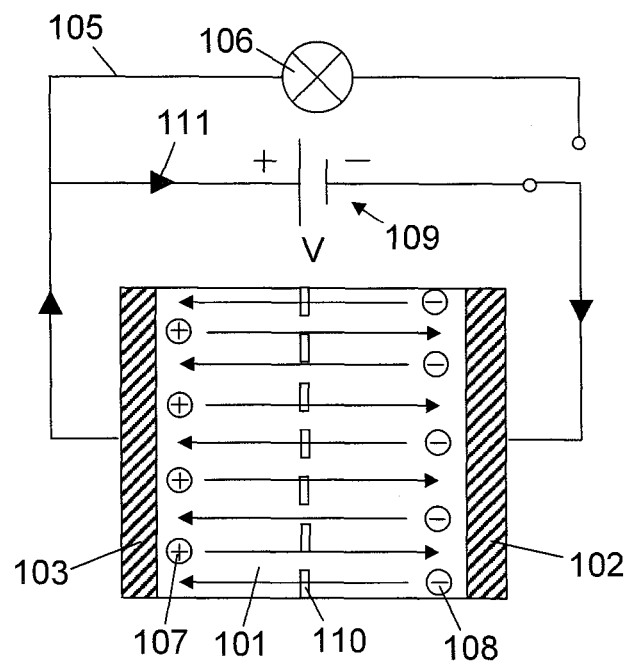
FIG. 1b illustrates schematically the charging process of a conventional battery.

A primary cell is any kind of battery in which the electrochemical reaction is not reversible. These are used as disposable batteries. With secondary batteries, on the other hand, the electrochemical reaction is reversible, meaning that the chemical reactants can be restored to their original state. These are used as rechargeable batteries. The charging process of a conventional rechargeable battery is shown in FIG. 1b. To charge the battery, a potential difference is applied between the anode 102 and cathode 103. The positive terminal of the charger 109 strips electrons from the cathode 103 and returns them to the anode 102 (indicated by the arrows 111), inducing chemical reactions at the electrode-electrolyte interface. Again, to compensate for the transfer of charge, positive 107 and negative 108 ions in the electrolyte 101 move between the electrodes 102, 103 in opposite directions to before.

The current and voltage generated by a battery is directly related to the materials used for the electrodes and electrolyte. The ability of a material to lose or gain electrons with respect to another material is known as its electrode potential. The strengths of oxidising and reducing agents are indicated by their standard electrode potentials. Materials with a positive electrode potential are used to form the anode, whilst those with a negative electrode potential are used to form the cathode. The greater the difference between the anode and cathode potentials, the greater the amount of electrical energy that can be produced by the cell.

Lithium appears at the top of the electrochemical series (large negative electrode potential), indicating that it is the strongest reducing agent. Likewise, fluorine appears at the bottom of the electrochemical series (large positive electrode potential), indicating that it is the strongest oxidising agent. As a result of lithium's high electrode potential, lithium batteries are capable of producing voltages of nearly 4V, over twice the voltage of a zinc-carbon or alkaline battery. Depending on the choice of materials for the anode, cathode and electrolyte, the current, voltage, capacity, life and safety of a lithium battery can change dramatically. Recently, novel architectures have been employed to improve the performance of these batteries. Pure lithium is very reactive and will rigorously react with water to form lithium hydroxide and hydrogen gas. For this reason, non-aqueous electrolytes are used, and water is rigidly excluded from the battery pack using a sealed container.

That said, many different lithium batteries exist because of lithium's low reactivity with a number of cathodes and non-aqueous electrolytes. The term "lithium battery" refers to a family of different chemistries comprising lithium metal or lithium compounds as the anode with a host of different materials for the cathodes and electrolytes. A porous carbon material often serves as a cathode charge collector to receive electrons from the external circuit.

A lithium-ion battery is a different type of rechargeable battery which uses a lithium ion "intercalation" mechanism rather than traditional redox reactions. This involves the insertion of lithium ions into and out of the crystal structure of the electrodes as the ions pass back and forth between the electrodes during charging and discharging. To achieve this, the electrodes require open crystal structures which allow the insertion and extraction of lithium ions, and the ability to accept compensating electrons at the same time. Such electrodes are called "intercalation hosts". Lithium-ion batteries are currently one of the most popular types of battery for portable electronics because they exhibit one of the best energy-to-weight ratios, no memory effect, and a slow loss of charge when not in use.

In a typical lithium-ion battery, the anode is made from carbon, the cathode is a metal oxide, and the electrolyte is a lithium salt in an organic solvent. Commercially, the most popular anode material is graphite, and the cathode is generally one of three materials: a layered oxide (such as lithium cobalt oxide), one based on a polyanion (such as lithium iron phosphate), or a spinel (such as lithium manganese oxide). The electrolyte is typically a mixture of organic carbonates such as ethylene carbonate or diethyl carbonate containing complexes of lithium ions. These non-aqueous electrolytes often comprise non-coordinating anion salts such as lithium hexafluorophosphate ($LiPF_6$), lithium hexafluoroarsenate monohydrate (LiAsF$_6$), lithium perchlorate (LiClO$_4$), lithium tetrafluoroborate (LiBF$_4$), and lithium triflate (LiCF$_3$SO$_3$).

Figure 2A:
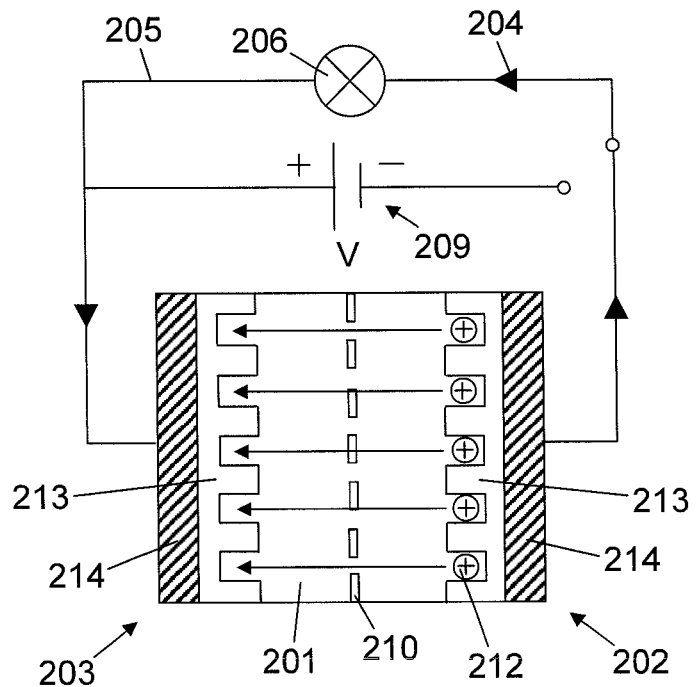
FIG. 2a illustrates schematically the discharge process of a lithium-ion battery.
Figure 2B:
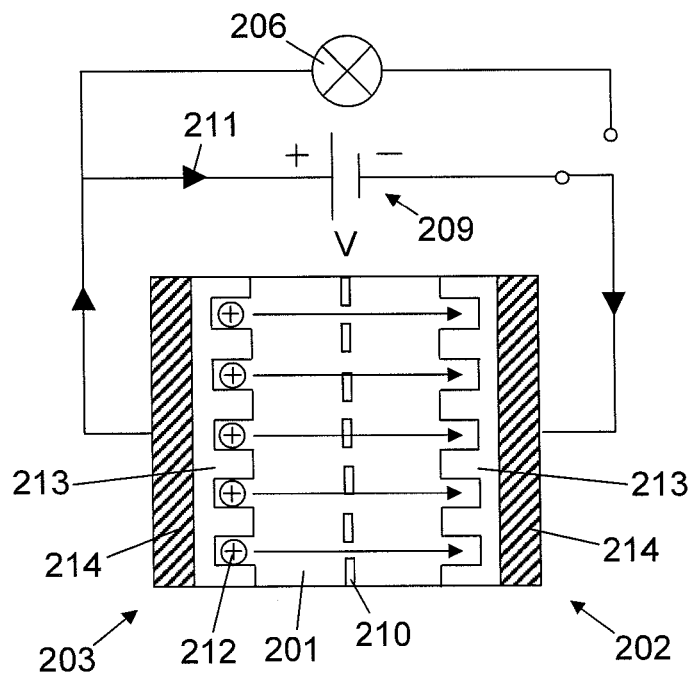
FIG. 2b illustrates schematically the charging process of a lithium-ion battery.

FIGS. 2a and 2b illustrate schematically the discharge and charging processes of a lithium-ion battery, respectively. As shown in the figures, the anode 202 and cathode 203 each comprise an open-crystal intercalation material 213 deposited on top of a charge-collecting substrate 214. During discharge, lithium ions 212 are extracted from the anode 202, migrate across the electrolyte 201, and are inserted into the crystal structure of the cathode 203. At the same time, compensating electrons travel in the external circuit (in a direction indicated by the arrows 204) and are accepted by the cathode 203 to balance the reaction. This process is completely reversible. During charging, an external electrical power source (the charger 209) applies a potential difference between the electrodes 202, 203 forcing the electrons to travel in the opposite direction (indicated by the arrows 211). The lithium ions 212 are then extracted from the cathode 203, migrate across the electrolyte 201, and are inserted back into the crystal structure of the anode 202.

In a lithium-ion battery, the lithium ions are transported to and from the cathode and anode, with the transition metal, cobalt (Co), in Li$_x$CoO$_2$ being oxidised from Co$^{3+}$ to Co$^{4+}$ during charging, and reduced from Co$^{4+}$ to Co$^{3+}$ during discharge. The anode and cathode half-reactions for a lithium-ion battery comprising a graphite anode and a lithium cobalt oxide cathode are as follows:

$$\text{Anode } xLi^+ + xe^- + 6C \leftrightarrows Li_xC_6 \quad \text{Equation 1}$$

$$\text{Cathode } LiCoO_2 \leftrightarrows Li_{1-x}CoO_2 + xLi^+ + xe^- \quad \text{Equation 2}$$

The overall reaction has its limits, however. Overdischarging the lithium-ion battery can supersaturate the lithium cobalt oxide, leading to the production of lithium oxide, by the following irreversible reaction:

$$Li^+ + LiCoO_2 \rightarrow Li_2O + CoO \quad \text{Equation 3}$$

whilst overcharging the lithium-ion battery can lead to the synthesis of Co$^{4+}$ by the following irreversible reaction $$LiCoO_2 \rightarrow Li^+ + CoO_2 \quad \text{Equation 4}$$

In contrast to batteries, capacitors store charge electrostatically, and are not capable of generating electricity. A relatively new type of capacitor known as a "supercapacitor" (also known as an electric double layer capacitor, an ultracapacitor, a pseudocapacitor, and an electrochemical double layer capacitor) offers greater energy storage than a conventional or electrolytic capacitor, and is becoming increasingly popular for portable electronic applications.

FIGS. 3a and 3b illustrate schematically the charging and discharge processes of a supercapacitor, respectively. Supercapacitors have a cathode 303 and an anode 302, each comprising an electrically conducting plate 314 (charge collector), which are separated by an electrolyte 301. When a liquid electrolyte is used, the supercapacitor may also comprise a separator 310 to prevent direct physical contact between the cathode and anode. The plates 314 are coated in a porous material 315 (such as powdered carbon) to increase their surface area for greater charge storage. When a power supply (charger) applies a potential difference between the electrodes 302, 303, the electrolyte 301 becomes polarised. The potential on the cathode 303 attracts negative ions 308 in the electrolyte 301, and the potential on the anode 302 attracts positive ions 307.

Unlike batteries, the applied potential is kept below the breakdown voltage of the electrolyte 301 to prevent electrochemical reactions from taking place at the surface of the electrodes 302, 303. For this reason, supercapacitors cannot generate electricity like electrochemical cells. Also, without electrochemical reactions taking place, no electrons are generated. As a result, no significant current can flow between the electrolyte 301 and the electrodes 302, 303. Instead, the ions 307, 308 in solution arrange themselves at the surfaces of the electrodes 302, 303 to mirror the surface charge 316 and form an insulating "electric double layer". In an electric double layer (i.e. a layer of surface charge 316 and a layer of ions 307, 308), the separation of the surface charge 316 and ions 307, 308 is on the order of nanometers. The combination of the electric double layer and the use of a high surface area material 315 on the surface of the plates 314 allow a huge number of charge carriers to be stored at the electrode-electrolyte interface.

To discharge the supercapacitor, an electrical connection 305 is made between the charged electrodes 302, 303, causing electrons to flow from the anode to the cathode via the external circuit (as indicated by the arrows 304). This flow of charge can be used to power one or more electrical components 306 in the external circuit 305.

Activated carbon is not the most suitable material 315 for coating the plates 314 of the capacitor, however. The ions 307, 308 in solution are relatively large in comparison to the pores in the carbon, and this limits the energy storage considerably. Recent research in this area has focused on the use of carbon nanotubes and carbon nanohorns instead, both of which offer higher useable surface areas than activated carbon.

Supercapacitors have several advantages over batteries, and as a result, have been tipped to replace batteries in many applications. They function by supplying large bursts of current to power a device and then quickly recharging themselves. Their low internal resistance, or equivalent series resistance (ESR), permits them to deliver and absorb these large currents, whereas the higher internal resistance of a traditional chemical battery may cause the battery voltage to collapse. Also, whilst a battery generally demands a long recharging period, supercapacitors can recharge very quickly, usually within a matter of minutes. They also retain their ability to hold a charge much longer than batteries, even after multiple chargings. When combined with a battery, a supercapacitor can remove the instantaneous energy demands that would normally be placed on the battery, thereby lengthening the battery lifetime.

Whereas batteries often require maintenance and can only function well within a small temperature range, supercapacitors are maintenance-free and perform well over a broad temperature range. Supercapacitors also have longer lives than batteries, and are built to last until at least the lifetime of the electronic devices they are used to power. Batteries, on the other hand, typically need to be replaced several times during the lifetime of a device.

Supercapacitors are not without their drawbacks, however. Despite being able to store a greater amount of energy than conventional and electrolytic capacitors, the energy stored by a supercapacitor per unit weight is considerably lower than that of an electrochemical battery. In addition, the working voltage of a supercapacitor is limited by the electrolyte breakdown voltage, which is not as issue with batteries.

Lithium-ion batteries have the highest energy density of all systems, whilst supercapacitors have the highest power density and lifetime. Recently, a new hybrid storage device called a lithium-ion capacitor has been developed which aims to integrate the advantages of lithium-ion batteries and supercapacitors. The cathode of a lithium-ion capacitor employs activated carbon at which charges are stored as an electric double layer at the interface between the carbon and the electrolyte, similar to a supercapacitor. The anode, on the other hand, is made of a nanostructured intercalation material pre-doped with lithium ions, similar to a lithium-ion battery. This pre-doping process lowers the anode potential and results in a high cell output voltage. Typically, output voltages for lithium-ion capacitors are in the range of 3.8V to 4V. As a consequence, lithium-ion capacitors have a high energy density. Furthermore, the capacity of the anode is several orders of magnitude greater than the capacity of the cathode. As a result, the change in anode potential during charging and discharging is far smaller than the change in cathode potential. The intercalation anode can also be coupled with an intercalation cathode, such as $LiCoO_2$ or $LiMn_2O_4$, to increase the power of the lithium-ion capacitor. The electrolyte used in a lithium-ion capacitor is typically a lithium-ion salt solution, and a separator may be used to prevent direct physical contact between the anode and cathode.

Figure 4A:
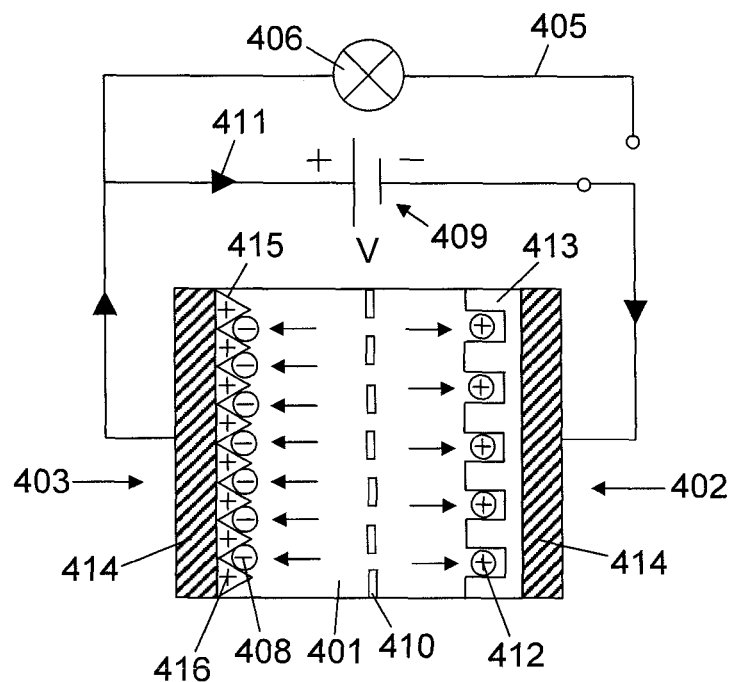
FIG. 4a illustrates schematically the charging process of a lithium-ion capacitor.
Figure 4B:
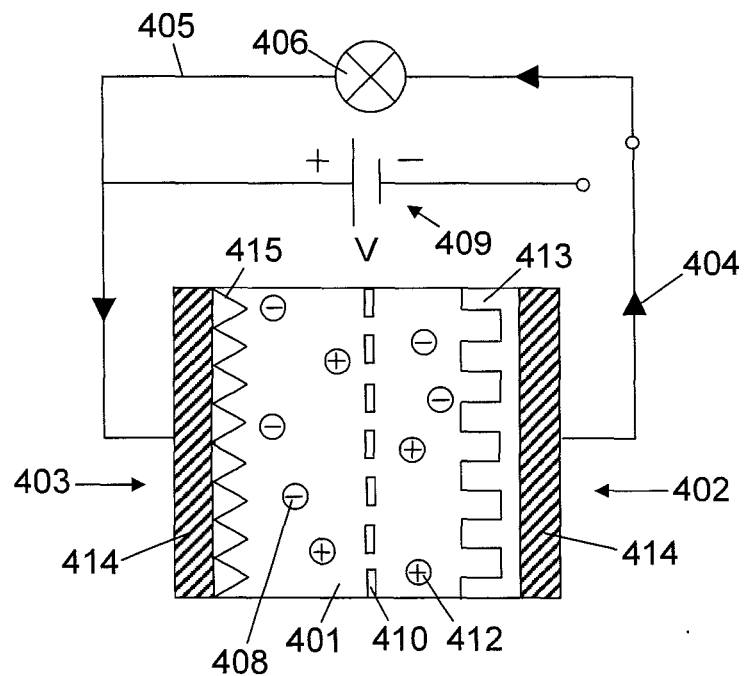
FIG. 4b illustrates schematically the discharge process of a lithium-ion capacitor.

FIGS. 4a and 4b illustrate schematically the charging and discharge processes of a lithium-ion capacitor, respectively. The behavior of a lithium-ion capacitor is much the same as that of a supercapacitor, and therefore the reference numerals of FIGS. 4a and 4b correspond to similar features in FIGS. 3a and 3b. The main difference between the two systems, however, is that instead of positive ions in the electrolyte 401 arranging themselves at the electrode-electrolyte interface to form an electric double layer when the device charges, lithium ions 412 insert themselves (intercalation) into the crystal structure 413 of the anode 402. Like a lithium-ion battery, therefore, lithium-ion capacitors undergo fast electrochemical reactions and do not simply rely on the formation of an electric double layer to store electrical charge.

As mentioned in the background section, batteries retain electrical energy below the threshold level of the devices they are used to power. This energy can sometimes be recovered by heating the battery and used to power devices for a short period of time. Such energy recovery may be particularly useful for making emergency telephone calls or text messages using a mobile phone, for example. Heating a battery to recover sub-threshold energy, however, causes increased degradation of lithium-ion batteries. Given that lithium-ion batteries are currently one of the most common types of rechargeable battery for portable electronics, an alternative means of sub-threshold energy recovery suitable for use with lithium-ion batteries would be advantageous. There will now be described an apparatus and associated methods that may or may not provide a solution to this problem. It should be noted, however, that the apparatus and methods described herein do not apply only to rechargeable (secondary) batteries, but can also be used in relation to primary batteries, supercapacitors, and battery-capacitor hybrids. In this respect, the term "electrical storage apparatus" as used throughout the specification encompasses all of these different technologies.

FIGS. 5a and 5b show an electrical storage apparatus comprising first 503 and second 502 electrodes separated by an electrolyte 517, 518. At least one of the first 503 and second 502 electrodes (possibly both) comprises a flexible and/or stretchable substrate 519, 520 (referred to herein as an "actuating substrate") configured to undergo physical strain (reversible deformation) when a force is applied to compress, stretch, or bend the material (i.e. mechanical actuation puts the actuating substrate 519, 520 under mechanical stress). This is illustrated in FIG. 6, where the arrows 621-624 indicate the direction of force. The physical strain may be tensile (arrows 623, 624), compressive (arrows 621, 622), volume or shearing strain.

When the actuating substrate 619, 620 undergoes deformation, the area of contact between the at least one electrode 602, 603 and the electrolyte 618 increases causing a decrease in the internal resistance of the electrical storage apparatus. The open circuit voltage, $E_{cell}$, of a battery is given by the following equation $$E_{cell}=E_C-E_A-|\eta_A|-|\eta_C|-iZ_{cell} \qquad \text{Equation 5}$$

where $E_C$ is the cathode potential, $E_A$ is the anode potential, $\eta_A$ is the anode chemical potential, $\eta_C$ is the cathode chemical potential, i is the current provided by the battery, and $Z_{cell}$ is the internal resistance of the battery. As can be seen from this equation, a reduction in the internal resistance increases the open circuit voltage of the battery.

Therefore, when the open circuit voltage of the electrical storage apparatus drops below the threshold potential of the device it is being used to power, deformation of the electrical storage apparatus (the actuating substrate 619, 620 in particular) can be used to recover the sub-threshold energy and provide additional power to the device. Once the sub-threshold energy has been used up, or when the sub-threshold energy is no longer required, the applied force can be withdrawn to allow the shape of the actuating substrate (and therefore the shape of the electrical storage apparatus) to return to its former state. It is important that the deformation is reversible, otherwise permanent damage to the electrical storage apparatus may occur. Furthermore, reversible deformation allows recovery of the sub-threshold energy after each discharge if need be (which makes it suitable for use with secondary batteries and not just primary batteries).

To enable reversible deformation, the actuating substrate 619, 620 comprises an elastomeric material such as polydimethylsiloxane (PDMS) or polyethylene terephthalate (PET). PMDS is particularly useful because it can undergo at least 20% strain without deleterious effects. To facilitate flexibility, however, the electrical storage apparatus may also comprise a liquid 517 (FIG. 5a) or polymer 518 (FIG. 5b) electrolyte, rather than a rigid electrolyte. If a liquid electrolyte 517 is used, the electrical storage apparatus may also comprise a separator 510 to prevent direct physical contact between the cathode 503 and anode 502. In this case, the electrolyte 517 may comprise a lithium salt dissolved in an organic solvent (e.g. a mixture of organic carbonates such as ethylene carbonate or diethyl carbonate containing complexes of lithium ions). With polymer electrolytes, however, the physical state of the electrolyte 518 may itself be sufficient to prevent direct physical contact between the cathode 503 and anode 502, thereby negating the need for a separator 510. The electrolyte 518 may comprise lithium phosphorous oxynitride or derivatives of poly(ethylene oxide). Furthermore, the electrolyte 518 may be a polymer electrolyte containing borate ester groups.

The first 603 and second 602 electrode will typically comprise an active material (not shown) suitable for storing/generating electrical energy. The active material may be located on (as a coating) or within (to form a composite) the actuating substrate 619, 620 provided it is able to interact with the electrolyte 618. When the actuating substrate 619, 620 is deformed/actuated, the area of contact between the active material and the electrolyte 618 increases. In addition to the actuating substrate 619, 620 and active material, the electrodes 603, 602 of the electrical storage apparatus may comprise a charge-collection material (not shown).

The active material used will depend on the particular type of storage device, but is preferably formed from a reversibly deformable material. Since the active material is in contact (i.e. physically coupled) with the actuating substrate 619, 620, the dimensions (length, width or thickness) of the active material are varied when the actuating substrate 619, 620 is deformed. The use of a reversibly deformable material for the active component is therefore beneficial, as this enables repeated stretching, compressing and bending of the electrode whilst minimising damage to the active material. In this respect, the active material may comprise graphene, graphene platelets, a mesh of silver nanowires (i.e. a 2D network of silver nanowires), an interpenetrating matrix of silicon nanowires or carbon nanotubes, or a metal oxide slurry.

The use of graphene may be particularly beneficial for electrical generation/storage applications. Graphene-based materials are intriguing from the perspectives of fundamental science and technology because they are non-toxic, chemically and thermally tolerant, and mechanically robust. In the form of nanosheets with lateral sizes in the range of several hundred nanometers, graphene exhibits superior electrical conductivity to graphitic carbon, high mobility of charge carriers (20 m$^2$/V/sec), and fascinating transport phenomena such as the quantum Hall effect, high surface areas of over 2600 m$^2$/g, compatibility with a wide range of chemicals, and a broad electrochemical window that may be particularly advantageous for applications in energy technologies. Graphene nanosheets may be suitable for use as high capacity electrode materials in lithium batteries, lithium-ion batteries, supercapacitors and lithium-ion capacitors as a result of their ability to store a large number of ionic species (lithium ions in particular). In addition, graphene can be transferred to substrates for transparent electronic applications allowing the fabrication of transparent or semi-transparent energy storage devices.

Solution processing of graphene sheets by chemical reduction (as will be discussed shortly) may enable the mass-production of graphene solutions for printing processes. This approach is scalable (allowing the possibility of high-volume production) and versatile (in terms of being well-suited to chemical functionalisation). These advantages mean that the colloidal suspension method for producing graphene could be used for a wide range of applications, in particular, for the fabrication of battery/capacitor electrodes. Graphene-based energy harvesting and storage devices such as batteries and capacitors can potentially out-perform those based on carbon nanotubes. In the form of a colloidal suspension, graphene is also a non-toxic nanomaterial with adjustable solubility suitable for printing applications.

Furthermore, titanium dioxide ($TiO_2$), also known as titanate, facilitates lithium ion transportation and has been used in lithium-ion batteries. Enhanced conductivity of lithium ions has been observed when adding titanium dioxide nanoparticles to solid electrolytes. This effect has been linked to local structural modification of the titanium dioxide which promotes localised amorphous regions, thereby enhancing the transport of lithium ions. Lithium-titanate batteries utilise lithium-titanate nanocrystals (spinel structure) on the surface of its anode instead of carbon. This gives the anode a surface area of about 100 m$^2$/g compared with 3 m$^2$/g for carbon, allowing electrons to enter and leave the anode more quickly. This feature enables lithium-titanate batteries to charge and discharge faster than standard lithium-ion batteries. Lithium titanate spinel is a "zero-strain insertion material". In a battery using this material as an electrode, the insertion of lithium ions does not cause significant deformation of the crystal lattice. It is also intrinsically safe since it avoids electrochemical deposition of lithium. In addition, titanium dioxide is abundant, low cost and environmentally friendly. However, the conductivity of lithium titanate is limited, so it is important to make structures of nanosized crystals in contact with a conductive substrate to achieve a high rate of charge transfer to the electrode.

In one embodiment of the present disclosure, the electrode material (actuating substrate and active material) comprises a suspension of graphene platelets modified by large counter anions (in the form of an elastomeric polymer) together with titanium dioxide nanoparticles and a lithium salt. The graphene has a high surface area and is a good electrical conductor, whilst the titanium dioxide particles accommodate high concentrations of lithium ions but are not conducting themselves. By binding the two together using the ionic binder (large counter anions in polymeric form), a material is created which has the lithium storage capability of titanium dioxide, the electrical conductivity of graphene, and is reversibly deformable. By adding lithium salt to the material, lithium ions are incorporated into the electrode structure which further enhances the performance of the electrical storage apparatus. These lithium ions may be transferred to and/or from the cathode 503 and/or anode 502 during charging and/or discharging to enable the generation and/or storage of electrical energy.

The electrode material was prepared using the following method. It should be noted, however, that the quantities and parameters mentioned may be varied in order to scale-up production.

First, graphene oxide was prepared by oxidizing natural graphite powder (SP, 320 mesh) based on a modified Hummers method, as described in the research publication entitled "*Layer-by-Layer Assembly of Ultrathin Composite Films from Micron-Sized Graphite Oxide Sheets and Polycations*", by N. Kovtyukhova et al, Chem. Mater. 11, 771 (1999). The graphene oxide was then suspended in ultra-pure water to give a brown dispersion and subjected to dialysis for 4 days to completely remove residual salts and acids. The resulting purified graphene oxide powder was collected by centrifugation and then air-dried. Following this, the graphene oxide powder was dispersed in water to create a 0.05 wt % dispersion, and was then exfoliated through ultrasonication for 1 h, during which process the bulk graphene oxide powder were transformed into graphene oxide platelets.

Next, 20 mg of the graphene oxide platelets were distributed in 40 ml of ultra-pure water and mixed in an ultrasonic bath (KQ218, 60 W) for 15 mins to obtain a homogeneous and stable dispersion. Following this, 60 mg of an ionic polymeric binder (such as poly(sodium 4-styrenesulfonate), polyaniline, or poly[2,5-bis(3-sulfonatopropoxy)-1,4-ethynylphenylene-alt-1,4-ethynylphenylene]sodium salt) was added to the graphene oxide dispersion, and mixed in an ultrasonic bath (KQ218, 60 W) for another 15 mins. The resulting mixture was then reduced with hydrazine monohydrate (1.950 mL, 50%) at 80° C. for 24 h to obtain a homogeneous black dispersion. The black dispersion was then filtered through a polycarbonate membrane (0.22 μm pore size) and repeatedly washed with water to remove any excess binder (polymer). The resulting powder (comprising graphene platelets modified by the ions of the binder) was then redistributed into water by ultrasonication in a water bath (KQ218, 60 W) for 15 mins and centrifugation at 5000 rpm for 20 mins. A dark, homogeneous supernatant solution was obtained after removing the sediment. Finally, after synthesis of the functionalised graphene suspension, titanium dioxide nanoparticles (either rutile or anatase) and one or more lithium salts (e.g. $LiPF_6$, $LiBF_4$ and/or $LiClO_4$) were mixed into the solution by ultrasonication (KQ218, 60 W) for 15 mins. Whilst the titanium dioxide nanoparticles used here were less than 25 nm in size, larger particles could have been used instead. The resulting colloidal suspension can then be used as a printable ink to form the battery/capacitor electrodes.

Whilst PSS, polyaniline, and PPE have been mentioned above, the binder may comprise other polyelectrolytes with large anion groups, or silicon-containing gels that have suitable large anion alternatives. The large polymer anions ensure the effective solubilisation of graphene and attract positively-charged lithium ions into the graphene electrode matrix.

FIG. 7 illustrates schematically a (roll-to-roll) method of producing the electrical storage apparatus described above. In this method, all components are solution processed, and patterned or printed using existing liquid deposition or patterning technology. First, the graphene-based polymer 719 (the first electrode material) is deposited using a standard printing process. The electrode material 719 is then heated 725 to evaporate any solvent and facilitate binding of the graphene and the titanium dioxide. Next, a polymer electrolyte 718 is deposited on top of the first electrode material 719, before a second electrode material 720 is deposited on top of the electrolyte 718 to form the second electrode. Heat and/or pressure may be applied to the layered stack following deposition of the electrolyte 719 and/or second electrode material 720 to facilitate adhesion of the respective layers. Furthermore, a charge-collection material (possibly porous carbon or a metallic foil) may be deposited (not shown) to enable the transfer of electrons between each electrode and the external circuit. In this respect, the charge-collection material may be deposited on one or both sides of the electrode materials 719, 720. Alternatively, the electrode materials 719, 720 may be deposited on one or both sides of the charge-collection material. Either way, the external circuit would be electrically connected to the charge collector of each electrode.

It is also possible to use a liquid electrolyte rather than a gel (polymer) electrolyte. In this scenario, the process (not illustrated) may involve sequential deposition of the first electrode material, the separator, and the second electrode material, followed by a sealing step (possibly using heat, pressure, and/or an adhesive) to seal the edges of the electrical storage apparatus whilst making sure to leave a gap for insertion of the liquid electrolyte. Once the edges of the electrical storage apparatus have been sealed (except from the gap), the liquid electrolyte can be introduced between the electrodes, and the gap can be sealed to retain the electrolyte inside the electrical storage apparatus.

The material 621 used to form the second electrode will vary depending on whether the electrical storage apparatus is a lithium-metal battery, a lithium-ion battery, or a lithium-ion capacitor, and may or may not be reversibly deformable. To produce a lithium-metal battery or a lithium-ion battery, the graphene-based polymer electrode (described above) serves as a cathode. The anode may comprise lithium metal or a lithium compound (to form a lithium-metal battery) or may comprise graphite (to form a lithium-ion battery). On the other hand, to produce a lithium-ion capacitor, the graphene-based polymer electrode serves as an anode. In this scenario, the cathode may comprise a high surface area material (such as activated carbon) on top of a charge-collecting substrate, or may comprise an intercalation material (such as $LiCoO_2$ or $LiMn_2O_4$).

Although particular emphasis has been placed on graphene, other active materials may be used instead (including a silver nanowire mesh, silicon nanowires, carbon nanotubes, or a metal oxide slurry). It is important that the particle size of the active material is kept to a minimum in order to achieve the maximum effective surface area. It is also preferable if the particles have a smooth and compact shape, because sharp edges or flaky surfaces are susceptible to higher electrical stress and decomposition, which can cause greater heat generation and even thermal runaway when the electrical storage apparatus is in use. In this respect, silver nanowires are particularly favourable.

As mentioned previously, these materials could be mixed into the actuating substrate material (polymer/elastomer), or could be deposited on one or more surfaces of the actuating substrate material (assuming that the actuating substrate material has set/solidified). When the active material is deposited onto the surface of the actuating substrate, it may be patterned to form electrodes with a predefined surface structure. This may be used to maximise the surface area of the electrodes. Likewise, when the active material is mixed into the actuating substrate material to form a composite, the composite may form a patterned layer on top of a supporting substrate (e.g. a metallic foil charge collector).

Lift-off or etching techniques (not illustrated) may be used to pattern the active material/composite. Considering the lift-off process first of all, a layer of electron or photo sensitive resist is deposited onto the actuating/supporting substrate. The resist is then exposed to a beam of electrons (electron-beam lithography) or electromagnetic radiation (photolithography) and developed to create a predefined resist profile. Following the development step, the active material/composite is deposited on top of the resist layer, and then the resist is removed/stripped from the substrate.

The etching process, on the other hand, involves deposition of the active material/composite on top of the actuating/supporting substrate first of all. A layer of resist is then deposited onto the active material/composite before being exposed and developed as described above. Following the development step, a wet or dry etchant is used to remove any exposed active material/composite, and then the resist is removed/stripped from the substrate.

Figure 8:
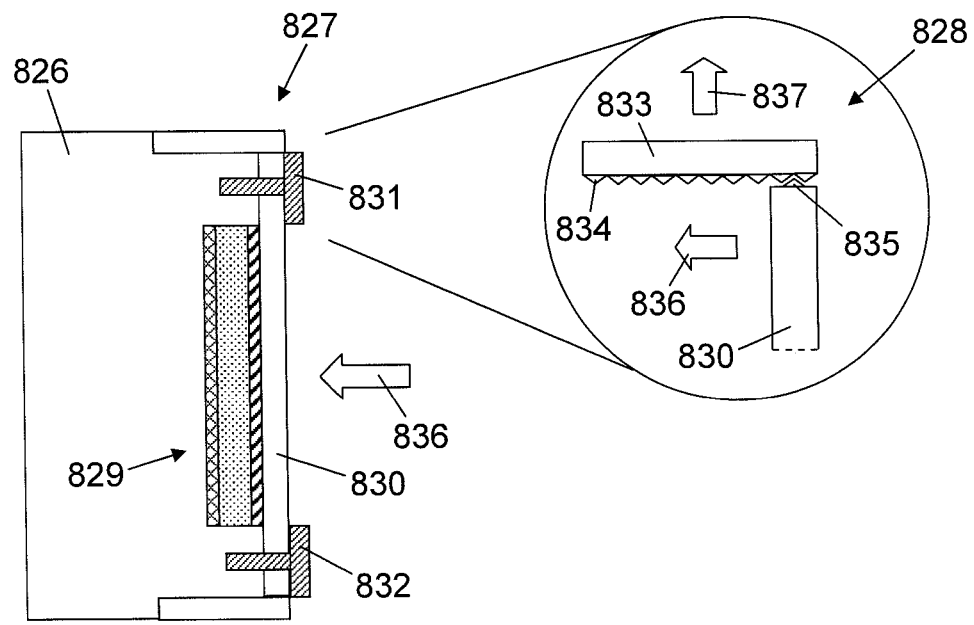
FIG. 8 illustrates schematically an actuating mechanism and a locking mechanism.

FIG. 8 illustrates schematically a device 826 comprising an actuating mechanism 827 and a locking mechanism 828 for use in recovering sub-threshold energy from the electrical storage apparatus 829. The actuating mechanism 827 may enable the user to control the level of deformation of the electrical storage apparatus 829 (i.e. tunable deformation). In the example illustrated, the actuating mechanism 827 causes mechanical compression of the electrical storage apparatus 829 by a plate 830 (which may be a battery cover) on the device 826. To control the degree of compression, the user turns one or more screws 831, 832 on the device 826 to drive the plate 830 towards the electrical storage apparatus 829. Since the electrical storage apparatus 829 is secured in place within the device 826, movement of the plate 830 pushes against the electrical storage apparatus 829 causing deformation of the actuating substrate forming part of the first and/or second electrodes. Movement of the plate 830 may also cause deformation of the electrolyte and/or deformation of the active and charge-collection materials of the first and/or second electrodes. Compression of the electrical storage apparatus 829 causes a decrease in the internal resistance, thereby increasing the open circuit voltage to allow operation of the device 826. The use of screws 831, 832 to drive the plate 830 into the electrical storage apparatus 829 is clearly only one possibility, and other mechanisms may be employed.

Rather than turning screws 831, 832 to move the plate 830, the device 826 may be configured to allow the user to manually push the plate 830 towards the electrical storage apparatus 829. In this respect, the enlarged region of FIG. 8 shows a locking mechanism 827 that may be used to maintain the current level of compression without requiring the user to continually apply pressure to the plate 830. This locking mechanism 828 takes the form of a releasable ratchet comprising a linear rack 833 (although it may be a circular gear) of mechanical teeth 834, and a pivotable, spring-loaded pawl 835 that engages with the teeth 834. Typically, the teeth 834 are uniform but asymmetrical, each tooth having a moderate slope on one edge and a steeper slope on the other edge.

When the plate 830 is pushed towards the electrical storage apparatus 829 in the direction of the arrow 836, the pawl 835 moves unrestricted over the gently sloping edges of the teeth 834. A spring forces the pawl 835 into the depression between the teeth 834 as it passes the tip of each tooth. When the plate 830 is released, however, the reversibly deformable materials of the electrical storage apparatus 829 are unable to return to their previous form because the pawl 835 catches on the steeply sloped edge of the first tooth it encounters. In this way, the pawl 835 is locked against the tooth and the plate 830 is prevented from moving any further from the electrical storage apparatus 829.

When the electrical storage apparatus 829 needs to be recharged, the plate 830 can be moved back to its original position by retracting the teeth 834 from the pawl 835 (represented by the arrow 837). This may be performed by pressing a button (not shown) on the side of the device 826. The use of a ratchet to hold the plate 830 against the electrical storage apparatus 829 is clearly only one possibility, and other mechanisms may be employed.

Another option may involve the use of a shape memory material as the actuating substrate and/or electrolyte. Shape memory materials (typically polymers) are so-called "smart materials" that have the ability to return from a deformed shape to their original shape under the influence of an external stimulus (trigger). The external stimulus may be a change in temperature or the application of an electric or magnetic field. In this embodiment, mechanical compression could be used to decrease the internal resistance of the electrical storage apparatus, and the shape memory material would remain in the compressed state (and therefore maintain this level of internal resistance) until the external stimulus is applied. The use of a shape memory material is therefore advantageous in the sense that a locking mechanism is not required.

Figure 9:
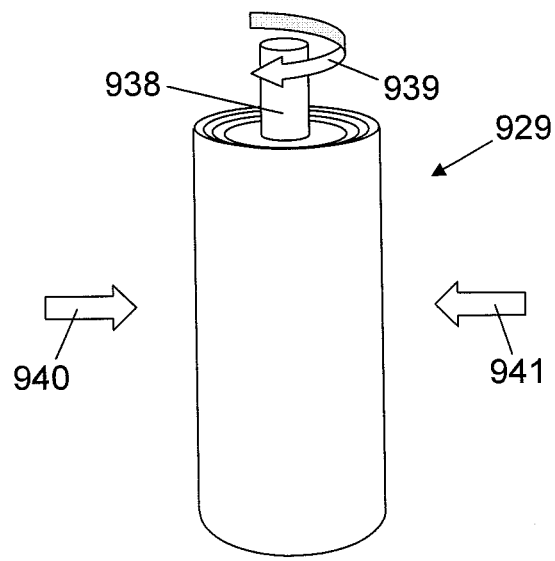
FIG. 9 illustrates schematically a reversibly deformable electrical storage apparatus having a roll-up form factor.

The electrical storage apparatus 829 may take different forms. For example, the electrical storage apparatus 829 may be packaged in the form in which it was deposited (i.e. having a planar structure), or it may be rolled up into a cylindrical structure. FIG. 9 illustrates an electrical storage apparatus 929 having a roll-up form factor. The roll-up form factor has the advantage that it may be compressed using two different techniques.

In the embodiment illustrated in FIG. 9, the electrical storage apparatus 929 is attached to, and rolled around, an elongate element 938 (such as a stick or post). The elongate element 938 may extend outside the casing of the electronic device such that the user can access it. When the user wishes to compress the electrical storage apparatus 929, he/she can simply rotate the elongate element 938 about its long axis as shown by the arrow 939. Rotation of the elongate element 938 causes tightening of the roll and increases the number of turns. This, in effect, causes compression of the reversibly deformable materials and reduces the internal resistance of the electrical storage apparatus 929.

It is also possible to compress the electrical storage apparatus 929 by applying a force perpendicular to the length of the roll as indicated by the arrows 940, 941 (e.g. using the plate of the device as shown in FIG. 8). In this scenario, the force applied compresses each of the layers/turns of the electrical storage apparatus 929 simultaneously.

Actuation or reversible deformation of the actuating substrate (and possibly also of the electrolyte, active material, and/or charge-collection material) may be performed thermally rather than by simply applying mechanical force. This embodiment is shown schematically in FIG. 10*a*, and comprises a heating element 1042 configured to increase the temperature of the actuating substrate 1019 and induce physical strain in the substrate 1019 via thermal expansion. Elastomers typically exhibit high thermal expansion coefficients (TECs), and can withstand high operating temperatures. For example, PMDS has a TEC of 330 ppm/K and has a maximum operating temperature of 150° C. Using PMDS as the actuating substrate 1019 therefore, an increase in temperature of 100° C. causes a relative increase in volume of ~0.033. Assuming isotropic expansion, the change in volume is given by $$\frac{dV}{V} = \left(\frac{dL}{L+1}\right)^3 - 1 \quad \text{Equation 6}$$

where V and L are the volume and length of the actuating substrate, respectively. This equates to an approximate strain of 1.08% in all dimensions. It is possible to mix various elastomers with different molecular weights together to make different grades of elastomer which can expand more than PMDS.

Figure 10A:
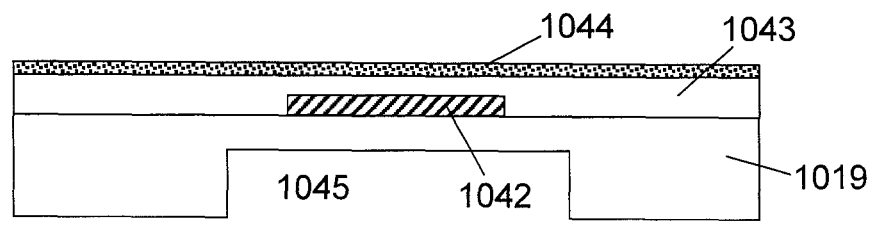
FIG. 10a illustrates schematically in cross-section an actuating substrate configured for thermal actuation.

In the embodiment shown in FIG. 10*a*, a membrane 1043 is formed in the actuating substrate 1019 to thermally isolate the heating element 1042 from the surrounding material. In this way, if the active material 1044 is located on the surface of the actuating substrate 1019 (i.e. at the interface between the actuating substrate 1019 and the electrolyte), heat produced by the heating element 1042 can be concentrated towards the active material 1044, instead of dissipating through the adjacent substrate material 1045. Removal of the adjacent substrate material 1045 may be performed by back etching or partially developing the elastomer. Since the membrane 1043 is made from the same elastomer as the bulk of the actuating substrate 1019, the risk of breakage is minimised as a result of its inherent flexibility.

Figure 10B:
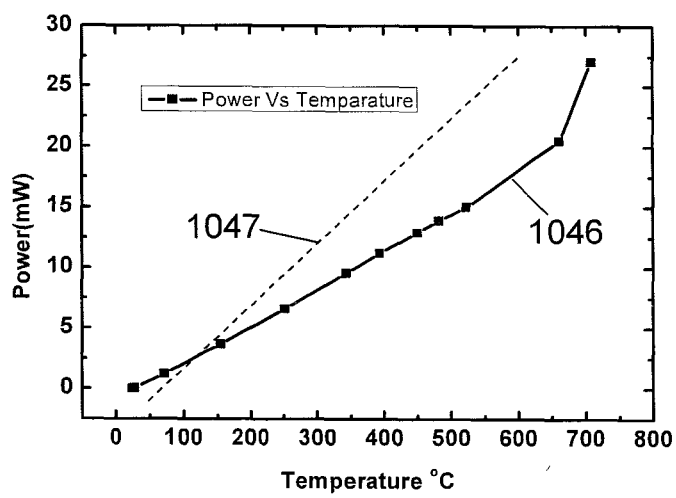
FIG. 10b shows how the power required by the embedded heater varies with temperature.
Figure 10C:
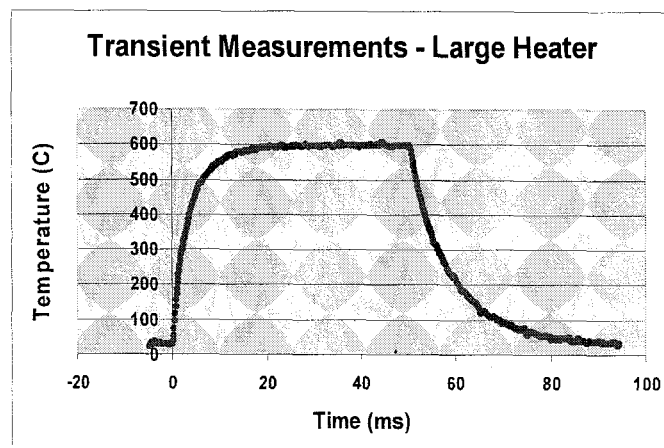
FIG. 10c shows how the temperature of the embedded heater varies with time during a heating and subsequent cooling cycle.

The heating element 1042 may be formed from any electrically and thermally conducting material which can undergo resistive heating (such as gold or copper), and may comprise one or more nanowires. The heating element may also be reversibly flexible and/or stretchable to allow it to conform to the changing dimensions of the actuating substrate 1019. Heating experiments were performed using heating elements 1042 made from copper wires with radii of 500 µm (1046) and 1 mm (1047). These experiments have shown that temperatures of up to 500° C. can be achieved with power requirements of ~20 mW (FIG. 10*b*). The change in temperature over time during a heating and cooling cycle of the 500 µm element is shown in FIG. 10*c*. This graph shows that the temperature of the heating element 1042 can be increased from 30-600° C. in ~20 ms by passing an electrical current through the wire. Once the flow of current was stopped, the temperature dropped back down to 30° C. in ~80 ms. A thermal response like this allows the heating element 1042 to be pulsed rapidly for expanding and contracting the actuating substrate 1019 whilst minimising the overall power consumption.

Piezoelectric actuation is another possible way of controlling the dimensions of the actuating substrate (and electrical storage apparatus is general). In this embodiment, the actuating substrate comprises a piezoelectric material configured to undergo physical strain when exposed to an applied DC electric field. The piezoelectric material may comprise one or more piezoelectric nanostructures, and the electric field may be generated by one or more electrode pairs, each comprising first and second electrodes of opposite polarity.

Two different electrode configurations are shown in FIGS. 11a and 11b. In FIG. 11a, the electric field is generated by an array of interdigitated electrodes 1148, 1149 configured to induce uniaxial strain in the piezoelectric material, whilst in FIG. 11b, the electric field is generated by concentric circular electrodes 1150, 1151 configured to induce radial strain in the piezoelectric material. In both configurations, the piezoelectric nanostructures 1152 are arranged between every second electrode gap. This arrangement helps to ensure that a non-zero net strain is induced in the piezoelectric material when the electric field is applied. If the nanostructures 1152 were arranged between every electrode gap, adjacent electrode pairs would apply opposite forces on the material, thereby resulting in a reduced (possibly zero) net actuation. Alignment of the piezoelectric nanostructures 1152 may be achieved using dielectrophoresis or other nanowire assembly methods.

It is important to note that no (or minimum) current should flow between the electrodes 1148, 1149; 1150, 1151 via the piezoelectric nanostructures 1152. Free charges in a piezoelectric material 1152 screen the applied electric field and reduce displacement of the material. Furthermore, current flow through the nanostructures 1152 increases power consumption in the device, which is undesirable. The piezoelectric nanostructures 1152 may be coated in an electrically insulating material to prevent the flow of current in the event that any of the nanostructures 1152 happen to be in physical contact with both the first and second electrodes of an electrode pair.

The piezoelectric nanostructures 1152 may comprise lead zirconate titanate (PZT) or polyvinylidene fluoride (PVDF), both of which have high piezoelectric coefficients. Whilst PVDF has piezoelectric coefficients which are two orders of magnitude less than PZT, the maximum actuation strain of PVDF is 0.3% compared with 0.1% for PZT. This demonstrates that limitations associated with the maximum tolerable field strength set stringent upper bounds on achievable strain values.

FIG. 11c shows how the potential difference, $V_{bias}$, required to achieve 1% strain in PZT varies with electrode separation. The potential difference was calculated using $$V_{bias} = \frac{4SL}{d} \qquad \text{Equation 7}$$

where S is the strain, L is the electrode separation and d is the piezoelectric constant for PZT in the axial direction. As can be seen from the graph, $V_{bias}$ scales linearly as the electrode separation is increased. A practical potential difference of ~20V corresponds with an electrode separation of 200 nm.

When thermal or piezoelectric actuation is used to deform the electrical storage apparatus, the actuation mechanism may comprise a control for the heating element or electric field, respectively. Given that the actuation is controlled electrically in these embodiments, no locking mechanism is required.

Figure 12:
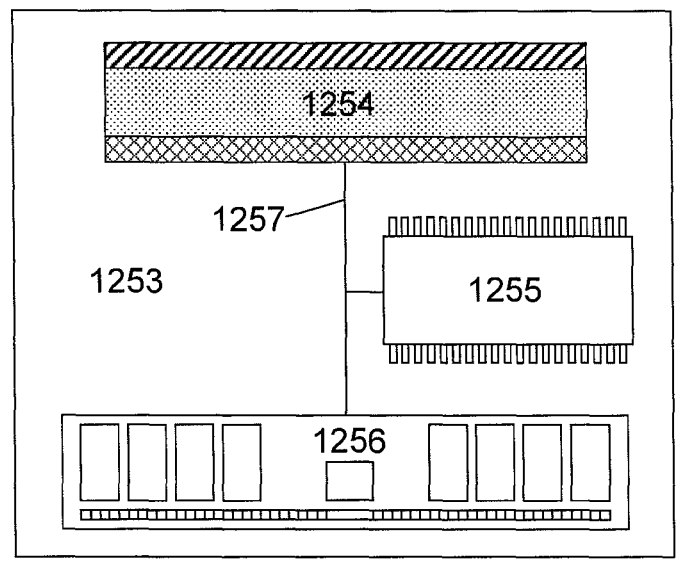
FIG. 12 illustrates schematically an apparatus comprising a reversibly deformable electrical storage apparatus.

FIG. 12 illustrates schematically a device 1253 comprising the electrical storage apparatus 1254 described herein. The device 1253 also comprises a processor 1255, and a storage medium 1256, which are electrically connected to one another by a data bus 1257. The device 1253 may be an electronic device, a portable electronic device, a portable telecommunications device, or a module for any of the aforementioned devices.

The electrical storage apparatus 1254 is configured to generate and/or store electrical energy, which may be used to power the device 1253. In particular, the electrical storage apparatus 1254 is configured to undergo reversible deformation during actuation, deformation of the electrical storage apparatus 1254 causing a decrease in the internal resistance of the electrical storage apparatus 1254. This enables the recovery/use of sub-threshold energy stored in the electrical storage apparatus 1254.

The processor 1255 is configured for general operation of the device 1253 by providing signalling to, and receiving signalling from, the other device components to manage their operation. The processor 1255 may also be configured to control actuation of the actuating substrate. In the thermal actuation embodiment, the processor 1255 is used to control power to the heating element, and therefore controls the temperature and thermal expansion/contraction of the actuating substrate. In the piezoelectric embodiment, the processor 1255 is used to control power to the electrodes, and therefore controls the applied electric field and piezoelectric expansion/contraction of the actuating substrate.

The storage medium 1256 is configured to store computer code configured to perform, control or enable the making and/or operation of the electrical storage apparatus 1254, as described with reference to FIG. 15. The storage medium 1256 may also be configured to store settings for the other device components. The processor 1255 may access the storage medium 1256 to retrieve the component settings in order to manage the operation of the other device components. In particular, the storage medium 1256 may comprise a list of power settings for the heating element and/or electrodes in order to obtain specific internal resistances and output voltages from the electrical storage apparatus. The storage medium 1256 may be a temporary storage medium such as a volatile random access memory. On the other hand, the storage medium 1256 may be a permanent storage medium such as a hard disk drive, a flash memory, or a non-volatile random access memory.

Figure 13:
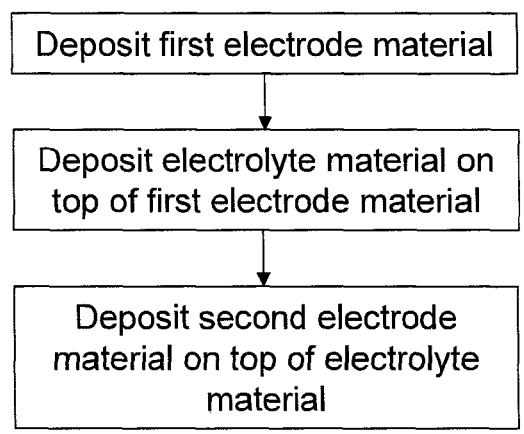
FIG. 13 illustrates schematically a method of making a reversibly deformable electrical storage apparatus.
Figure 14:
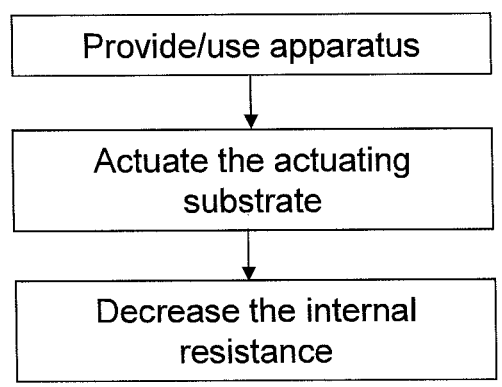
FIG. 14 illustrates schematically a method of decreasing the internal resistance of a reversibly deformable electrical storage apparatus.

The main steps of the method used to make the electrical storage apparatus 1254 are illustrated schematically in FIG. 13. Likewise, the main steps of the method used to operate the electrical storage apparatus 1254 are illustrated schematically in FIG. 14.

Figure 15:
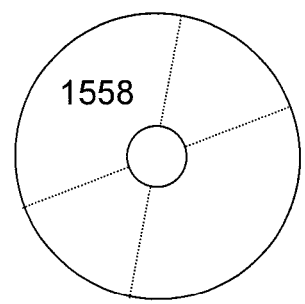
FIG. 15 shows a computer readable medium providing a program for controlling the making and/or use of a reversibly deformable electrical storage apparatus.

FIG. 15 illustrates schematically a computer/processor readable medium 1558 providing a computer program according to one embodiment. In this example, the computer/processor readable medium 1558 is a disc such as a digital versatile disc (DVD) or a compact disc (CD). In other embodiments, the computer/processor readable medium 1558 may be any medium that has been programmed in such a way as to carry out an inventive function. The computer/processor readable medium 1558 may be a removable memory device such as a memory stick or memory card (SD, mini SD or micro SD).

The computer program may comprise computer code configured to perform, control or enable one or more of the following: deposition of a first electrode material; deposition of an electrolyte material on top of the first electrode material; and deposition of a second electrode material on top of the electrolyte material to form an electrical storage apparatus comprising first and second electrodes separated by an electrolyte, at least one of the first and second electrodes comprising an actuating substrate configured to undergo reversible deformation during actuation, wherein reversible deformation of the actuating substrate causes a decrease in the internal resistance of the electrical storage apparatus.

The computer program may also be configured to perform, control or enable one or more of the following: provision of an electrical storage apparatus comprising first and second electrodes separated by an electrolyte, at least one of the first and second electrodes comprising an actuating substrate configured to undergo reversible deformation during actuation, wherein reversible deformation of the actuating substrate causes a decrease in the internal resistance of the electrical storage apparatus; and actuation of the actuating substrate.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising first and second electrodes separated by an electrolyte, at least one of the first and second electrodes comprising an actuating substrate configured to undergo reversible deformation during actuation,
   wherein reversible deformation of the actuating substrate is achieved by physical compression of the actuating substrate to cause a decrease in the internal resistance of the apparatus,
   wherein the actuating substrate is configured to increase contact area upon reversible deformation,
   wherein the electrolyte is a polymer electrolyte;
   wherein the at least one electrode comprises an active material on or within the actuating substrate;

wherein reversible deformation of the actuating substrate increases the area of contact between the active material and the electrolyte to cause the decrease in internal resistance; and wherein reversible deformation that increases the area of contact between the active material and the electrolyte is by a lateral expansion of the actuating substrate and the electrolyte in directions substantially parallel to the directions in which faces of the actuating substrates extend; and wherein at least one of the active material and electrolyte are reversibly deformable.

2. The apparatus of claim 1, wherein the actuating substrate comprises an elastomer.

3. The apparatus of claim 1, wherein the active material comprises at least one of the following:
graphene, graphene platelets, a silver nanowire mesh, silicon nanowires, carbon nanotubes, and a metal oxide slurry.

4. The apparatus of claim 1, wherein the apparatus is a battery, a supercapacitor, or a battery-capacitor hybrid.

5. The apparatus of claim 1, wherein the actuating substrate is configured for one or more of mechanical and piezoelectric actuation.

6. The apparatus of claim 1, wherein the at least one electrode comprises a piezoelectric material, and wherein the piezoelectric material is configured to undergo reversible deformation when exposed to an applied electric field.

7. The apparatus of claim 1, wherein the apparatus comprises at least one of an electronic device, a portable electronic device, a portable telecommunications device, and a module for any of the aforementioned devices.

8. The apparatus of claim 7, wherein the apparatus comprises an actuation mechanism for effecting actuation of the actuating substrate.

9. The apparatus of claim 8, wherein the at least one of the first and second electrodes comprises a piezoelectric material, the piezoelectric material configured to undergo physical reversible deformation when exposed to an applied electric field, and wherein the actuation mechanism enables control of the electric field.

10. The apparatus of claim 8, wherein the actuation mechanism enables mechanical compression of the actuating substrate.

11. The apparatus of claim 10, wherein the apparatus comprises a locking mechanism for maintaining the current level of mechanical compression.

12. A method comprising:
providing/using an apparatus comprising first and second electrodes separated by an electrolyte, at least one of the first and second electrodes comprising an actuating substrate configured to undergo reversible deformation during actuation, wherein reversible deformation of the actuating substrate causes a decrease in the internal resistance of the apparatus, wherein the actuating substrate is configured to increase contact area upon reversible deformation, and wherein the electrolyte is a polymer electrolyte; and actuating the actuating substrate by physically compressing the actuating substrate to cause the decrease in internal resistance of the apparatus;

wherein the first and second electrodes comprise an active material on or within the actuating substrate;

wherein reversible deformation of the actuating substrate increases the contact area between the active material and the electrolyte to cause the decrease in internal resistance of the apparatus;

wherein reversible deformation that increases the contact area between the active material and the electrolyte is by a lateral expansion of the actuating substrate and the electrolyte in directions substantially parallel to the directions in which faces of the actuating substrates extend; and wherein at least one of the active material and electrolyte are reversibly deformable.

13. An apparatus comprising first and second electrodes separated by an electrolyte, at least one of the first and second electrodes comprising an actuating substrate configured to undergo reversible deformation during actuation, wherein reversible deformation of the actuating substrate is achieved by physical compression of the actuating substrate to cause a decrease in the internal resistance of the apparatus, wherein the actuating substrate is configured to increase contact area upon reversible deformation, wherein the electrolyte is a polymer electrolyte;

wherein the at least one electrode comprises an active material on or within the actuating substrate;

wherein reversible deformation of the actuating substrate increases the area of contact between the active material and the electrolyte to cause the decrease in internal resistance;

wherein reversible deformation that increases the area of contact between the active material and the electrolyte is by a lateral expansion of the actuating substrate and the electrolyte in directions substantially parallel to the directions in which faces of the actuating substrates extend; and wherein the actuating substrate is configured for one or more of mechanical and piezoelectric actuation.

14. The apparatus of claim 13, wherein the actuating substrate comprises an elastomer.

15. The apparatus of claim 13, wherein the active material comprises at least one of the following:
graphene, graphene platelets, a silver nanowire mesh, silicon nanowires, carbon nanotubes, and a metal oxide slurry.

16. The apparatus of claim 13, wherein the apparatus is a battery, a supercapacitor, or a battery-capacitor hybrid.

17. The apparatus of claim 13, wherein the at least one electrode comprises a piezoelectric material, and wherein the piezoelectric material is configured to undergo reversible deformation when exposed to an applied electric field.

18. The apparatus of claim 13, wherein the apparatus comprises at least one of an electronic device, a portable electronic device, a portable telecommunications device, and a module for any of the aforementioned devices.

19. The apparatus of claim 18, wherein the apparatus comprises an actuation mechanism for effecting actuation of the actuating substrate.

20. The apparatus of claim 19, wherein the at least one of the first and second electrodes comprises a piezoelectric material, the piezoelectric material configured to undergo physical reversible deformation when exposed to an applied electric field, and wherein the actuation mechanism enables control of the electric field.

* * * * *